(12) United States Patent
Denzler et al.

(10) Patent No.: US 12,723,389 B2
(45) Date of Patent: Sep. 1, 2026

(54) METHOD FOR IDENTIFYING A JET REGULATOR

(71) Applicant: Neoperl GmbH, Müllheim (DE)

(72) Inventors: Oliver Denzler, Bottmingen (CH); Frank Denzler, Binningen (CH)

(73) Assignee: Neoperl GmbH, Müllheim (DE)

(*) Notice: Subject to any disclaimer, the term of this patent is extended or adjusted under 35 U.S.C. 154(b) by 357 days.

(21) Appl. No.: 17/927,993

(22) PCT Filed: May 21, 2021

(86) PCT No.: PCT/EP2021/063566
§ 371 (c)(1),
(2) Date: Nov. 28, 2022

(87) PCT Pub. No.: WO2021/244864
PCT Pub. Date: Dec. 9, 2021

(65) Prior Publication Data

US 2023/0214991 A1 Jul. 6, 2023

(30) Foreign Application Priority Data

Jun. 3, 2020 (DE) ......................... 102020114780.5

(51) Int. Cl.
*E03C 1/084* (2006.01)
*G06T 7/00* (2017.01)
(Continued)

(52) U.S. Cl.
CPC .............. *E03C 1/084* (2013.01); *G06T 7/001* (2013.01); *G06T 7/62* (2017.01); *G06T 7/68* (2017.01);
(Continued)

(58) Field of Classification Search
CPC . E03C 1/084; E03C 1/08; G06T 2207/30108; G06T 7/001; G06T 7/62;
(Continued)

(56) References Cited

U.S. PATENT DOCUMENTS 8,548,221 B2 * 10/2013 Kishii .............. G06K 19/06037 382/141
2004/0013286 A1 1/2004 Viola et al.
(Continued)

FOREIGN PATENT DOCUMENTS

EP 2105845 9/2009

OTHER PUBLICATIONS

Wikipedia, “Camera” , May 1, 2025 https://en.wikipedia.org/wiki/Camera (Year: 2025).*

*Primary Examiner* — Sumati Lefkowitz
*Assistant Examiner* — Connor L Hansen
(74) *Attorney, Agent, or Firm* — Volpe Koenig

(57) ABSTRACT

A method for identifying a jet regulator (1) with improved precision and robustness is provided using a captured photo of a hole pattern (4) of an outlet structure (3) of the jet regulator (1). The captured photo is first compared with different stored hole pattern types (15) in a computer-implemented manner in a first step, and based on an evaluation of the respective degree of a match between the captured photo and each hole pattern type (15), the hole pattern type (15) on which the captured hole pattern (4) is based is ascertained. Subsequently, in another step, the ascertained hole pattern type (15) and the captured hole pattern (4) are examined for deviations in a computer-implemented manner, and identification information which uniquely identifies the jet regulator (1) is ascertained in a computer-implement manner using detected or undetected deviations and is optionally output.

21 Claims, 4 Drawing Sheets

(51) Int. Cl.

| | |
|---|---|
| ***G06T 7/62*** | (2017.01) |
| ***G06T 7/68*** | (2017.01) |
| ***G06T 7/70*** | (2017.01) |
| ***G06V 10/75*** | (2022.01) |
| ***G06V 20/50*** | (2022.01) |

(52) U.S. Cl.

CPC .............. *G06T 7/70* (2017.01); *G06V 10/751* (2022.01); *G06V 20/50* (2022.01); *G06T 2207/30108* (2013.01)

(58) Field of Classification Search

CPC ..................... G06T 7/68; G06T 3/4053; G06T 2207/10056; G06T 2207/20021; G06T 2207/30136; G06T 7/0006; G06T 7/70; G06T 2207/30164; G06V 10/751; G06V 20/50

See application file for complete search history.

(56) References Cited

U.S. PATENT DOCUMENTS

2004/0091795 A1* 5/2004 Choi ......................... G03F 1/68 430/5
2004/0208372 A1 10/2004 Boncyk et al.
2011/0025876 A1* 2/2011 Denzler ................. G06V 20/52 382/136
2011/0262043 A1* 10/2011 Sato ....................... G06V 20/69 382/209
2014/0056495 A1* 2/2014 Janssens ................... G06T 5/80 378/207
2017/0016218 A1 1/2017 Denzler
2019/0369030 A1* 12/2019 Wu ......................... G06T 7/337
2022/0027619 A1* 1/2022 Piotrowski ............. G06V 20/10

* cited by examiner

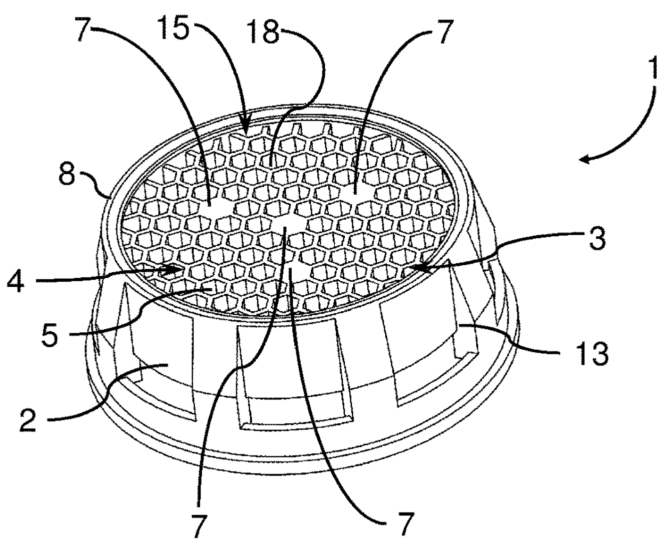
Fig. 3
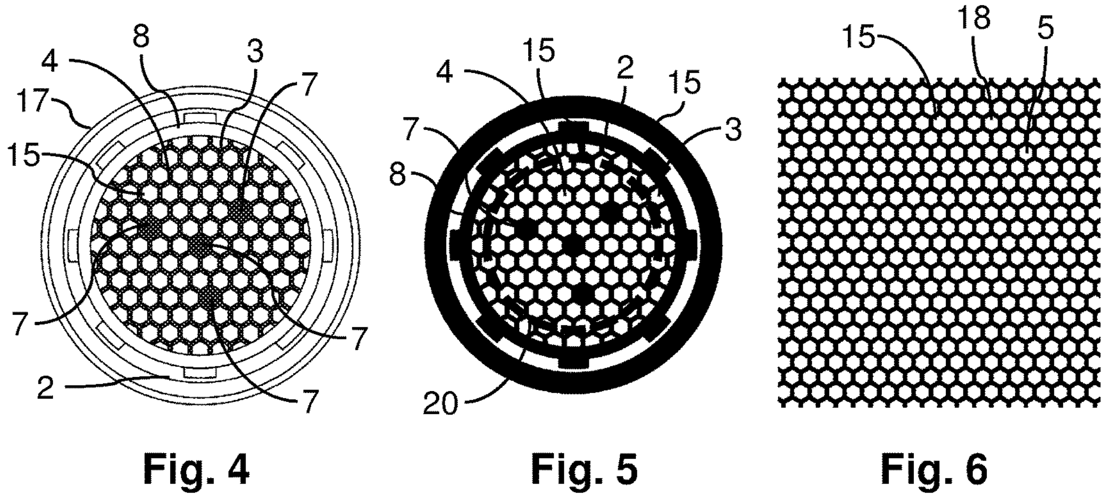
Fig. 4
Fig. 5
Fig. 6
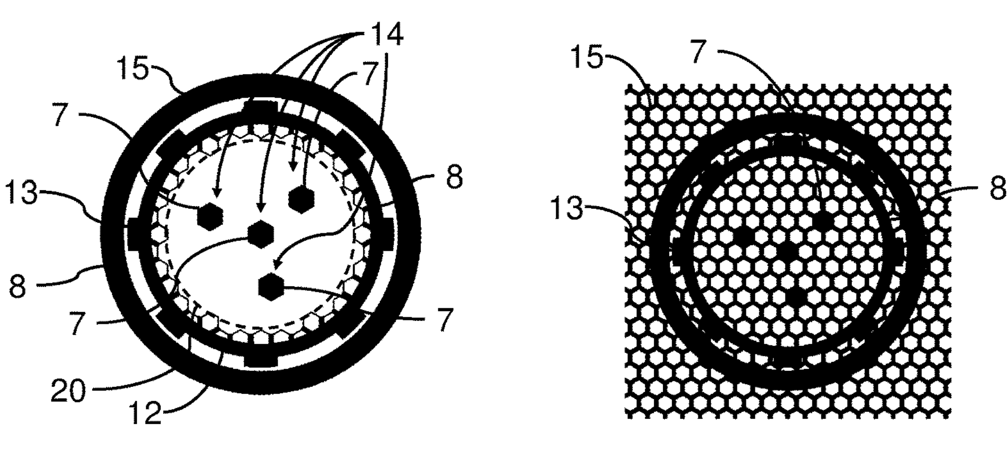
Fig. 7
Fig. 8

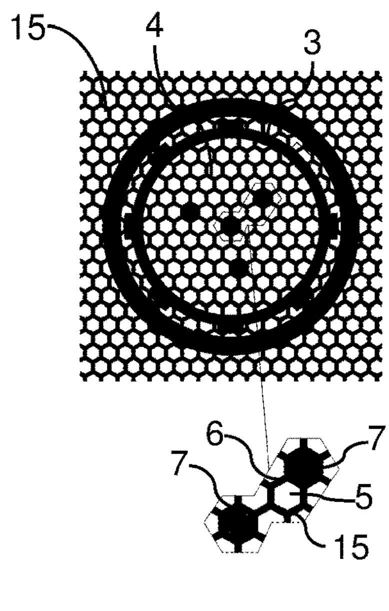
Fig. 9
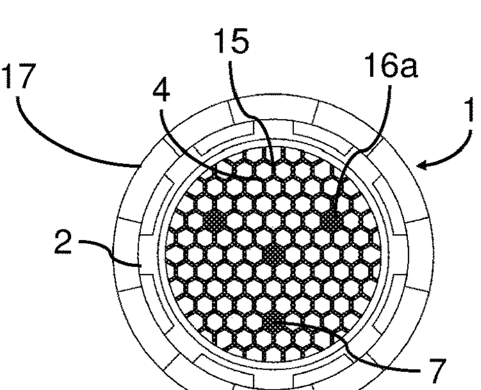
Fig. 11
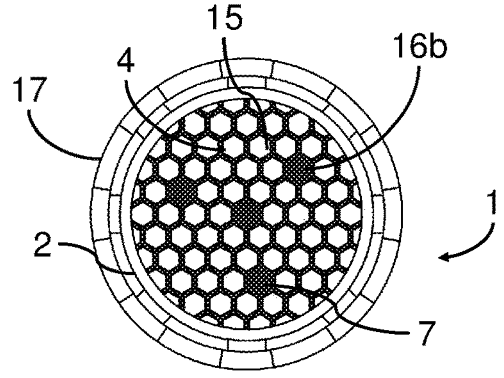
Fig. 12
Fig. 10
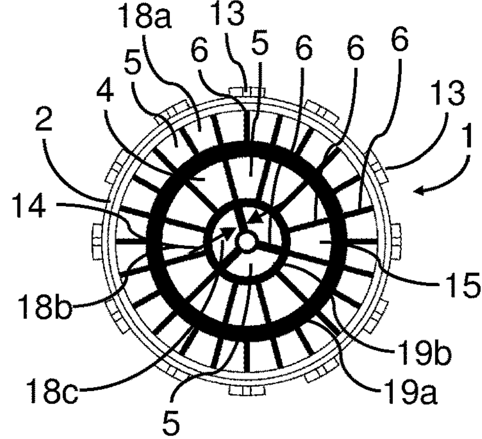
Fig. 13
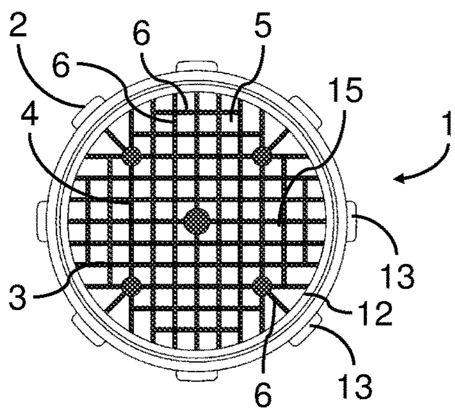
Fig. 14

METHOD FOR IDENTIFYING A JET REGULATOR

TECHNICAL FIELD

The invention relates to a method for identifying a jet regulator, often also referred to as a mixing nozzle, wherein the jet regulator has a housing on which an outlet structure having a hole pattern is formed on the outlet side. This outlet structure can be formed integrally with the housing or separately. In the method, a photo of the hole pattern is recorded in a recording step, wherein in an evaluation step, the recorded photo is evaluated in a computer-implemented manner, in an identification step, an item of identification information for the jet regulator is determined in a computer-implemented manner on the basis of a result of this evaluation, and in an output step, the identification information is output.

The invention furthermore relates to the execution of such a method on a portable electronic terminal and the use of such a method for sorting jet regulators.

BACKGROUND

A jet regulator can be designed, for example, as a nozzle which is attached to the outlet of a water tap. The jet regulator can thus, for example, unify, widen, or slow the water jet leaving the fitting. In general, air is admixed to the water for this purpose. In particular, the amount of water required for washing or rinsing can be reduced by the use of jet regulators.

Identification methods as described at the outset have already been implemented and tested to offer an easy and fast possibility for potential buyers of jet regulators, using which perceptible properties of an exiting water jet may be set, of identifying a still unknown jet regulator to the buyer. This can be necessary, for example, to ascertain associated functional properties of the jet regulator or simply the correct purchase price of the jet regulator by means of a catalog.

It has been shown in the practical implementation of such methods that the similarity of the dimensions of different jet regulators represents a problem. This is because it is generally necessary to distinguish the dimensions that a reference scale is recorded together with the jet regulator in the recording step, to thus permit a differentiation even of different, but very similar jet regulators on the basis of an accurate measurement of the jet regulator. In this recording, however, optical effects such as distortions or simply only an inclination of the reference scale often occur in practice, which unavoidably result in measurement inaccuracies. Therefore, the reference scale often cannot be evaluated sufficiently accurately in practice so that different jet regulators having very similar dimensions can actually be distinguished with certainty.

The invention is therefore based on the object of improving the method described at the outset in such a way that higher accuracy and statistical certainty are achieved in the identification of different jet regulators, in particular those having similar dimensions.

To achieve this object, one or more of the features disclosed herein are provided according to the invention in a method for identifying a jet regulator. In particular, it is therefore proposed according to the invention to achieve the object in the case of a method for identifying a jet regulator of the type mentioned at the outset that in said evaluation step, a hole pattern type of the recorded hole pattern and at least one deviation between the recorded hole pattern and the hole pattern type are ascertained on the basis of the photo and that in the identification step, the identification information is determined at least on the basis of the at least one ascertained deviation.

In contrast to what has been typical up to this point in previously known methods, the method according to the invention is therefore not directed to accurate measurement of the jet regulator, but follows the alternative approach of identifying the jet regulator on the basis of its characteristic hole pattern in the outlet structure.

The hole pattern can typically be based here on an underlying hole pattern type, for example a regular grid structure, and furthermore can have characteristic deviations, thus, for example, flaws or distinctive points, in particular in the form of filled holes or in the form of webs deviating from the hole pattern type.

Initially it is unimportant here which actual size the jet regulator and thus the hole pattern has. The size in which the hole pattern is depicted on the recorded photo also has little relevance. This is because, for example, with the aid of scaling functions implemented in software, the hole pattern type can be determined independently of the actual size of the hole pattern in the recorded photo. For this purpose, the recorded photo can be scaled before the determination of the hole pattern type so that the recorded hole pattern in the photo has a standard size. An accurate size determination of the jet regulator can therefore be omitted. It can therefore be provided in the method that the recorded photo is scaled to ascertain the hole pattern type, in particular in such a way that the hole pattern assumes a preset target size in the recorded image.

For the determination of a large number of different jet regulators, a fixed set of hole pattern types can be stored, to which the respective recorded hole pattern can be compared. Furthermore, it is helpful if the deviation between the hole pattern of the respective jet regulator to be identified and the hole pattern of the stored hole pattern type is formed so that it can be ascertained in an automated manner by means of simple image recognition algorithms.

The increased level of robustness of the identification with respect to variations of the image quality of the recorded photo and thus a higher statistical certainty in the identification of the jet regulator, which can be understood as the determination of a "jet regulator type", in the meaning of product information, are advantageous in the method according to the invention.

A further advantage for the customer is that the use of a reference scale can be omitted. Rather, it is sufficient to record a reasonably sharp image of the hole pattern of the outlet structure and to analyze it with the aid of corresponding software which implements the method according to the invention.

The object can also be achieved according to the invention by further advantageous embodiments as described below and in the claims.

For example, it can be advantageous if in the identification step, the identification information is determined on the basis of the ascertained hole pattern type. This can take place either additionally or also alternatively to the determination of the identification information on the basis of the ascertained at least one deviation in the identification step. This feature is possibly of independent inventive quality and can also be combined taken as such with the method described at the outset.

In particular, it is therefore proposed according to the invention to achieve the object in a method for identifying a jet regulator of the type mentioned at the outset that in the identification step, the identification information is determined, additionally or alternatively, at least on the basis of one or the ascertained hole pattern type.

To ascertain the hole pattern type in the evaluation step, a comparison of the recorded hole pattern to stored hole pattern types can take place. The determination of the hole pattern type can take place here, for example, on the basis of a degree of correspondence between the isolated hole pattern and a respective stored hole pattern type. For this purpose, the recorded hole pattern can be examined on the basis of the photo, for example, for characteristics, such as positions and alignments of edges or intersection points or such as positions and/or shapes of distinctive lines or such as frequency distributions of specific geometric structures of the hole pattern.

The hole pattern type can preferably be ascertained on the basis of a shape and/or a relative arrangement of cells of the recorded hole pattern. For example, a hexagonal cell shape is characteristic for a honeycomb grid, as is the relative offset of the individual honeycomb cells in relation to one another.

A comparison to corresponding characteristics, which characterize a respective stored hole pattern type, can then take place on the basis of such characteristics extracted from the recorded hole pattern.

In summary, in the evaluation step for determining the hole pattern type, a comparison can thus take place between characteristics of the recorded hole pattern and those of multiple stored hole pattern types. This comparison, and also all previously explained steps, can each preferably take place in a computer-implemented manner.

In the computer-implemented ascertainment of the hole pattern type, it can be provided that deviations from the respective hole pattern type in the recorded image are permitted. This enables these deviations to be used in the following step for the identification of the jet regulator. To simplify this comparison, in particular the hole pattern can already be identified and/or isolated beforehand in the recorded photo, also preferably in a computer-implemented manner.

The deviations can preferably be determined in the evaluation step in that the hole pattern is isolated in the recorded photo as an image region and subsequently a subtraction is carried out between the isolated image region and the ascertained hole pattern type. It is preferred in this case if the isolated image region is aligned in relation to the hole pattern type before the subtraction.

To obtain further valuable information, the ascertained deviations can subsequently be compared to the ascertained hole pattern type. This can take place, for example, in that the deviations are brought into the best possible correspondence with the hole pattern type. It is possible by way of the comparison to ascertain relative positions of the deviations. These relative positions can relate to the underlying hole pattern and/or to the deviations in relation to one another and/or to the outlet structure or the housing. Further information about the relative arrangement of the deviations can thus be obtained. According to this approach, the ascertained hole pattern type can thus be used as a reference scale and/or coordinate system for ascertaining the relative positions of the deviations.

For simple handling for the customer, it is furthermore to be preferred if the ascertainment of the hole pattern type of the recorded hole pattern and/or the ascertainment of the at least one deviation each take place in a computer-implemented manner. This can take place, for example, by executing corresponding software on a smartphone, using the camera of which the photo of the hole pattern of the jet regulator to be identified has been recorded. For this purpose, the software can take over the two ascertainments and thus free the user from time-consuming independent determination. The method can thus run very quickly, which increases the convenience for the user and thus the user-friendliness.

The hole pattern type can therefore in particular be ascertained by means of pattern recognition and/or by means of calculation of a correlation, in particular with recourse to stored hole pattern types. These stored hole pattern types are thus used as a reference, to which the respective recorded hole pattern is compared, preferably in a computer-implemented and automated manner. Such reference hole pattern types can be saved in a memory or can be retrievable, for example, by means of software in a continuously updated manner from the Internet. It can thus be ensured that the method can be continuously adapted to jet regulators to be reidentified, since the list of reference hole pattern types can be continuously expanded or adapted.

Depending on whether the hole pattern of the jet regulator to be identified has a regular pattern or an irregular pattern having flaws, the associated stored hole pattern type can accordingly have a regular pattern or an irregular pattern having flaws.

Furthermore, both patterns, thus the hole pattern of the jet regulator to be identified and also the stored hole pattern type, can also be a regular or an irregular pattern/grid.

It is helpful for the functioning of the method in all of these cases if the hole pattern of the jet regulator to be identified displays a deviation in comparison to the associated stored hole pattern type of the jet regulator to be identified, which permits an identification of the jet regulator. In other words, it is advantageous if the deviation is made sufficiently distinctive that it is still recognizable in a computer-implemented manner with the aid of simple image recognition algorithms even on photos having non-optimum image sharpness.

Furthermore, it is also possible that different jet regulators to be identified belong to a common associated stored hole pattern type. This is because an identification of these two jet regulators is only still possible in this case if the respective deviations between the hole pattern of the respective jet regulator to be identified and the common hole pattern type differ sufficiently for unambiguous identification.

According to one preferred variant of the method according to the invention, the hole pattern type of the recorded hole pattern can thus be a regular pattern/grid. Additionally or alternatively, it can also be provided that the stored hole pattern types are each regular patterns/grids. The use of regular patterns can be advantageous to be able to make the associated image recognition software as simple as possible.

The hole pattern type of the recorded hole pattern can alternatively be an irregular pattern/grid, however. In this case, the stored hole pattern types can thus accordingly be irregular patterns/grids.

The use of regular patterns has the advantage that different arrangement types of deviations can be formed. The deviations between the hole pattern of the jet regulator to be identified and the hole pattern type underlying it can in particular be arranged symmetrically or also asymmetrically with respect to the regular pattern of the hole pattern type. Two fundamentally different classes of associated hole patterns can thus already be formed for a predefined hole pattern type, namely those having asymmetrically arranged and those having symmetrically arranged deviations.

To make the identification of the jet regulator with the method according to the invention as robust as possible, in the evaluation step, upon the ascertainment of the hole pattern type of the recorded hole pattern, the recorded photo can be not only scaled but also rotated, i.e., in particular aligned, to thus bring the recorded hole pattern into congruence with the hole pattern type underlying it. This rotation can obviously take place on the software level. As a result, the identification of the jet regulator to be identified can therefore take place independently of rotation, so that the user does not have to align the hole pattern of the jet regulator to be identified in a specific orientation in relation to a camera, using which he has recorded the photo mentioned at the outset.

The robustness of the method can be increased further if, in the evaluation step, upon the ascertainment of the at least one deviation, a number of deviations and/or at least one relative position of the at least one deviation is detected, in each case in relation to the ascertained hole pattern type of the recorded hole pattern. This detection can also obviously take place in a computer-implemented manner.

Due to a higher number of deviations or the additional information about a relative position of the at least one deviation, thus in particular also about multiple relative positions of multiple deviations between the ascertained hole pattern type and the recorded hole pattern, more information is available, which can be evaluated to identify the jet regulator. It is accordingly preferred if, for example, at least two, very preferably at least four deviations are detected between the recorded hole pattern and the ascertained hole pattern type in the evaluation step.

This can be reasonable in particular to be able to distinguish the jet regulator to be identified from a further jet regulator, the hole pattern of which belongs to the same hole pattern type as that of the jet regulator to be identified, but which may be distinguished on the basis of its specific deviations from the jet regulator to be identified.

Specifically, such a deviation can be implemented, for example, in that in the recorded hole pattern a specific hole at a specific position is filled, for example in an intrinsic coordinate system of the hole pattern type, for example in relation to two determined Cartesian or skew coordinates or a specific radius and possibly a specific angle in relation to the center point of the hole pattern, with respect to the associated hole pattern type. Accordingly in the evaluation step upon the ascertainment of the at least one deviation, at least one filled hole of the recorded hole pattern can be detected with respect to the ascertained hole pattern type.

Furthermore, it can also be provided that in the evaluation step, upon the ascertainment of the at least one deviation, at least one hole changed in its shape and/or size and/or position and/or orientation is detected, wherein the change of the hole exists here in comparison to the ascertained hole pattern type.

A deviation can alternatively or additionally be provided by incomplete cells of the hole pattern type and/or by a delimitation of the hole pattern type. This is favorable in particular, for example, to recognize unauthorized reproductions (counterfeit products). This is because such reproductions can differ in detail from the jet regulator to be ascertained, for example, by cells or holes of the hole pattern determined at points being formed incompletely.

Alternatively or additionally, such a deviation can also be implemented in that a web is changed in the recorded hole pattern in comparison to an associated web of the associated hole pattern type. Such webs can be formed, for example, as partition walls which separate holes of the hole pattern from one another. Accordingly, in the evaluation step upon the ascertainment of the at least one deviation, at least one web of the recorded hole pattern changed in particular in its shape and/or size and/or position and/or orientation can be detected with respect to the ascertained hole pattern type.

Depending on at which point and/or in which orientation and/or in which shape, each with respect to the associated hole pattern type, a deviation is implemented in the hole pattern of the jet regulator to be identified, different arrangement types can be formed which characterize the respective jet regulator. In other words, an arrangement type in the meaning of the invention can thus define at which point and/or in which orientation and/or in which shape a deviation is implemented between the hole pattern to be identified and the hole pattern type underlying it.

If identifying the arrangement type is successful, the respective jet regulator is thus also identified according to the teaching of the invention. According to this approach according to the invention, one preferred variant of the method provides that in the evaluation step, an arrangement type of the ascertained at least one deviation is ascertained in a computer-implemented manner.

To ascertain the arrangement type characteristic for the hole pattern of the jet regulator to be identified, in particular a relative position of a deviation with respect to the ascertained hole pattern type can be taken into consideration and/or a relative position of at least two deviations in relation to one another can be taken into consideration. Alternatively or additionally, respective relative positions of at least two deviations can also be taken into consideration, each with respect to the ascertained hole pattern type. In all of these approaches, in the identification step, the identification information can then be determined at least, that is to say exclusively or also additionally to further items of information, on the basis of the ascertained arrangement type.

The identification of jet regulators becomes particularly challenging if different jet regulators have the same hole pattern and in particular belong to an identical arrangement type. To still enable identification with the aid of the method according to the invention in such cases, in the recording step, a photo of the outlet structure including the hole pattern can be recorded. In the evaluation step, a characteristic shape, for example an outer edge, of the outlet structure and/or a position of a marking of the outlet structure can then be ascertained on the basis of the recorded photo.

Alternatively or additionally thereto, in the evaluation step, a characteristic dimension, for example a diameter, for example of the outlet structure or the hole pattern, can also be ascertained on the basis of the recorded photo.

According to a further embodiment of the method, the characteristic dimension can also be a characteristic dimension of a cell of the hole pattern type, thus, for example, a clearance, for example of a honeycomb base cell of the hole pattern, or a web width, for example of such a cell or of webs of a radially-symmetrical grid.

The above-explained approaches each have the advantage that in the identification step, the identification information can be determined at least on the basis of the ascertained characteristic shape and/or at least on the basis of the ascertained position of the marking and/or at least on the basis of the ascertained characteristic dimension. Due to the ascertainment of this respective additional information, the jet regulator can therefore also be identified even if a further jet regulator having identical or at least very similar hole pattern exists, and specifically independently of whether the two hole patterns differ in their size or not, as long as only one further distinguishing feature (edge shape, marking, characteristic dimension, or the like) exists between the outlet structures of the two jet regulators, which can be identified by means of image recognition.

To effectuate demanding identification tasks, in the evaluation step, a geometric dimension of the hole pattern, for example, a width of a boundary circumferential around the hole pattern, can also be determined on the basis of the recorded photo. This is because such a geometric dimension can be used in the identification step to determine the identification information at least on the basis of the ascertained geometric dimension.

One embodiment which is particularly simple to implement on the software side provides that said characteristic dimension is a diameter of the outlet structure and the geometric dimension is a diameter of the hole pattern and that in the identification step, the identification information is determined at least on the basis of a ratio of these two diameters.

A further preferred embodiment provides for the approaches presented above that the characteristic dimension and/or the geometric dimension is determined with recourse to a stored type constant, thus, for example, a dimension of a honeycomb structure, of the ascertained hole pattern type. Such a type constant can in particular be a gird constant, such as a center distance of adjacent cells of the grid (either in the horizontal or vertical or diagonal direction).

This method has proven to be particularly robust in order to identify jet regulators which have a hole pattern which displays as the base structure a honeycomb structure or another regular pattern/grid. The stored type constant, for example, a horizontal and/or a vertical grid constant of the grid, is used here as a reference scale so that, for example, the diameter of the honeycomb structure may be estimated particularly easily as a multiple of this type constant.

For still other types of hole patterns, for example hole patterns having star-shaped, in particular radially-symmetrical structures, it can be advantageous for robust identification if, in the evaluation step, a number of axes of symmetry and/or at least one location of an axis of symmetry of the recorded hole pattern, with respect to the ascertained hole pattern type, is ascertained on the basis of the photo of the recorded hole pattern. The ascertained hole pattern type can provide a coordinate system here, on the basis of which the location of the axis of symmetry can be determined.

In this case, in the evaluation step, the ascertained number of axes of symmetry and/or the at least one location of said axis of symmetry can be utilized to ascertain the hole pattern type. It is significantly advantageous here if subsequently, in the identification step, the identification information is determined at least on the basis of the ascertained number of axes of symmetry and/or the at least one location of an axis of symmetry, since this additional information further increases the error tolerance and thus the robustness of the determination.

To provide further possible distinguishing features between jet regulators to be identified, the outlet structure forming the hole pattern can be lockable, for example, in various relative rotational positions with respect to the housing of the jet regulator, for example, during the assembly or during installation of the jet regulator. Furthermore, in particular with integral formation of the housing and the outlet structure, it can be that the outlet structure forming the hole pattern is arranged in a specific relative rotational position with respect to the housing. In all of these cases, in the identification step, the identification information can then be determined on the basis of a relative rotational position between the outlet structure and the housing of the jet regulator. This is because further information can be coded by different rotational positions which the outlet structure, in particular the hole pattern, assumes in the installed or completely produced state with respect to the housing, for example with respect to specific characteristic properties of the jet regulator, such as flow rate classes.

In other words, the relative rotational position of the outlet structure in the installed or completely produced state of the jet regulator with respect to the housing of the jet regulator can accordingly be used to code specific characteristic properties of the jet regulator. If the housing is integrally formed with the outlet structure, a specific rotational position between the outlet structure and the housing can already be fixed during the production of the jet regulator. In contrast, if the outlet structure is formed separately from the housing, specific relative rotational positions can thus be predefined, for example, by constructive provisions at a connection between the housing and the outlet structure, in which the outlet structure and thus the hole pattern is lockable with respect to the housing.

In such a design, it is preferred if the housing has an asymmetry, which can be recognized in the evaluation step and can be used to determine the relative rotational position. Furthermore, it is to be preferred if the hole pattern also has an asymmetry, so that the hole pattern in turn has an alignment which can be recognized in the evaluation step and can be used to determine the relative rotational position.

All above-discussed approaches within the method according to the invention have the decisive advantage that the identification of the jet regulator can take place without recourse to a reference scale in the recorded photo. This significantly facilitates the method for the user, since neither does a reference scale have to be present, nor does such a reference scale have to be aligned precisely in relation to the jet regulator to be identified.

In the vast majority of practical application situations, it will moreover be of significant advantage for a user if a method as described above is executed on a portable electronic terminal, for example, a smartphone, a notebook, or a tablet. This is because such devices typically offer all required hardware to be able to implement the above-discussed methods.

The method according to the invention for identifying a jet regulator (identification method) may additionally be used in the context of manufacturing processes of sanitary assemblies. The invention thus proposes in particular using an identification method as described above for sorting jet regulators. For example, it happens that various jet regulator deliveries are mixed and which jet regulator is of which type then has to be separated.

An identification method as described above can also be used in manufacturing or assembling processes of sanitary assemblies for sorting jet regulators. Thus, for example, from a loose collection of various jet regulator types, those types can be identified and separated which are to be used for the presently running manufacturing or assembling process.

It can be stated once again in summary that deviations of a respective hole pattern from an underlying hole pattern type can be formed by a change of a shape, size, position or orientation of a web or a hole of the hole pattern; and/or by a change of a geometric dimension of the respective hole pattern; and/or by a change of a number of axes of symmetry and/or at least one location of an axis of symmetry of the respective hole pattern; and/or by an additional rotation between the deviations and the underlying hole pattern type; and/or by an asymmetry of the hole pattern, wherein it is then preferred if the hole pattern type underlying the hole pattern has a symmetrical grid.

Furthermore, differences between the various arrangement types can be formed by differences in the number of the deviations; and/or in relative positions of the deviations with respect to the underlying hole pattern types and/or to one another; and/or in a characteristic type of the respective deviation.

And finally further differences detectable in the evaluation step can be formed in a characteristic shape of the outlet structure; and/or in a characteristic dimension of the outlet structure; and/or in a relative position of a marking of the outlet structure with respect to the respective hole pattern; and/or in a geometric dimension of the respective hole pattern, in particular measured on the basis of a type constant of the hole pattern type underlying the hole pattern; and/or in a relative rotational position of the outlet structure which the respective hole pattern forms, specifically with respect to a respective housing of the jet regulator, wherein it is to be preferred in this case if the housing has an asymmetry detectable in a computer-implemented manner.

All of these deviations or differences can be taken into consideration individually or in combination in the evaluation step of the method to identify the jet regulator in the identification step on the basis of these deviations or differences.

BRIEF DESCRIPTION OF THE DRAWINGS

The invention will now be described in more detail on the basis of exemplary embodiments, but is not restricted to these exemplary embodiments.

Further exemplary embodiments result by way of combination of the features of individual or multiple claims for protection with one another and/or with individual or multiple features of the respective exemplary embodiment. In particular, designs of the invention can thus be obtained from the following description of a preferred exemplary embodiment in conjunction with the general description, the claims, and the drawings.

In the figures:

Figure 1:
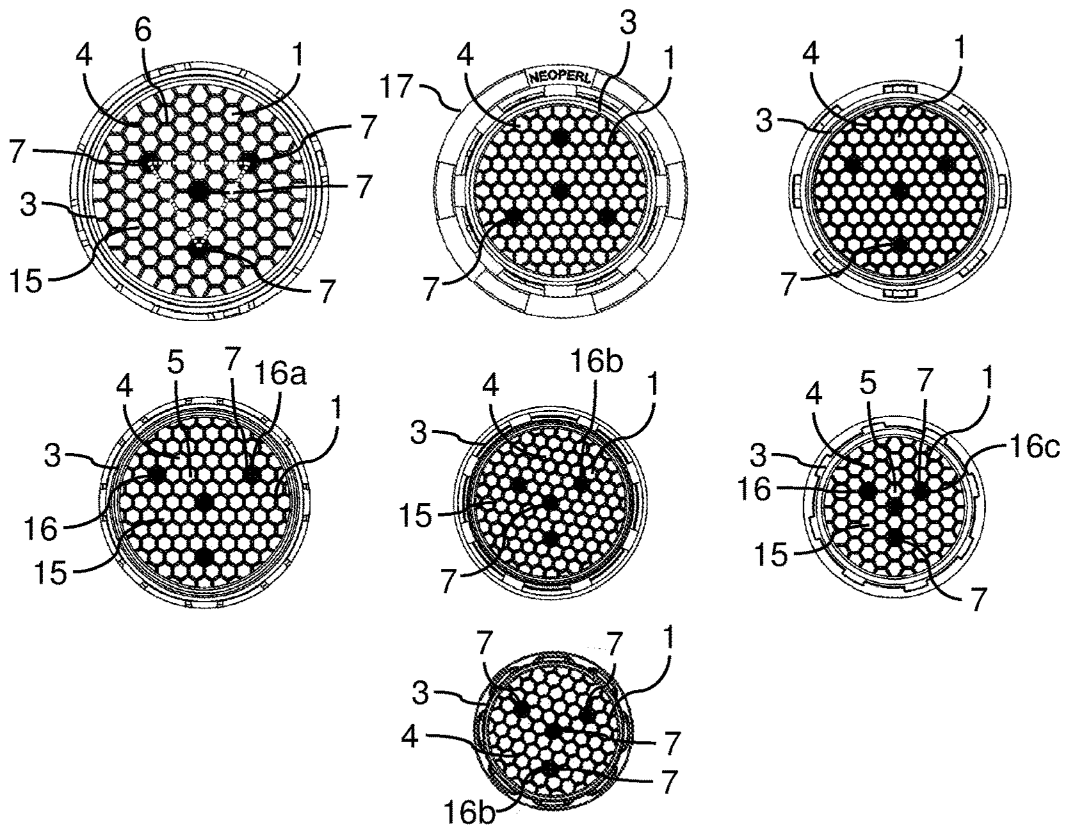
Figure 2:
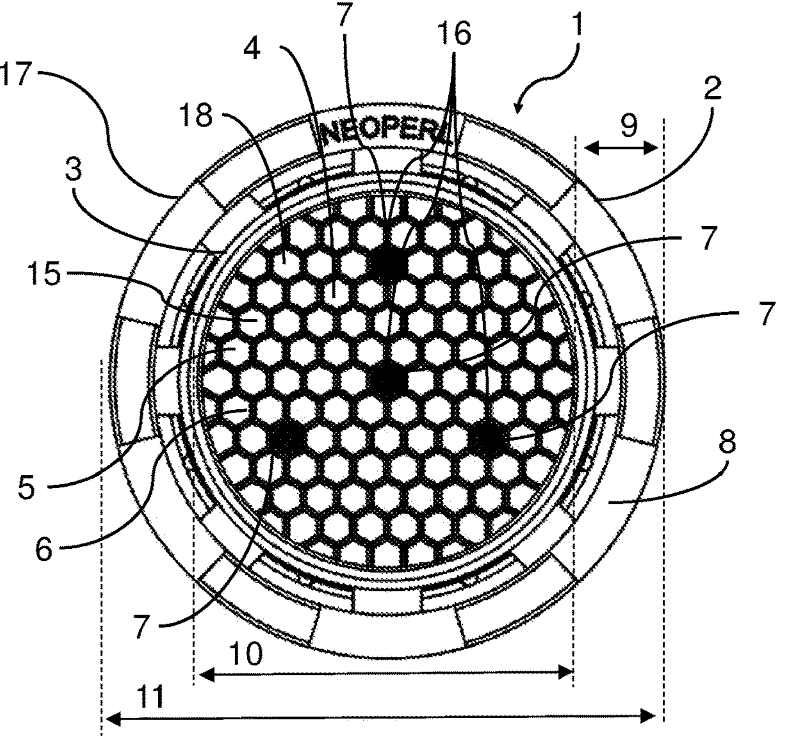
Figure 15:
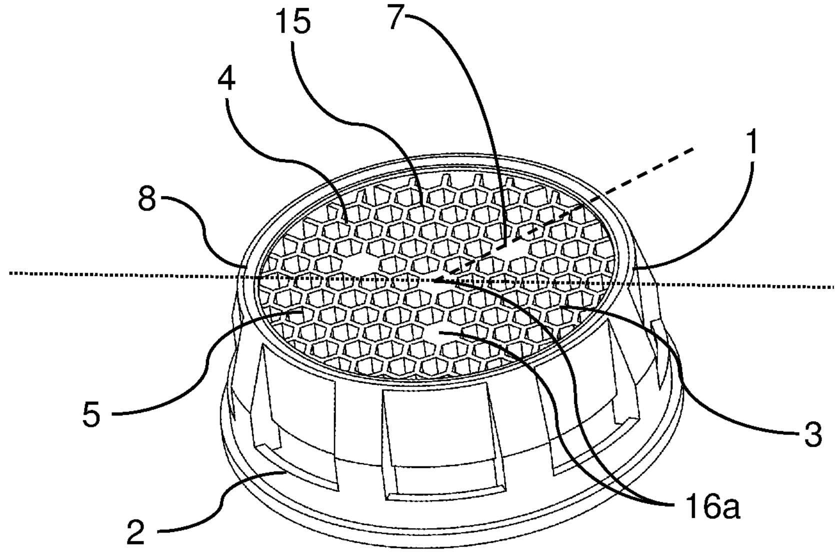
Figure 16:
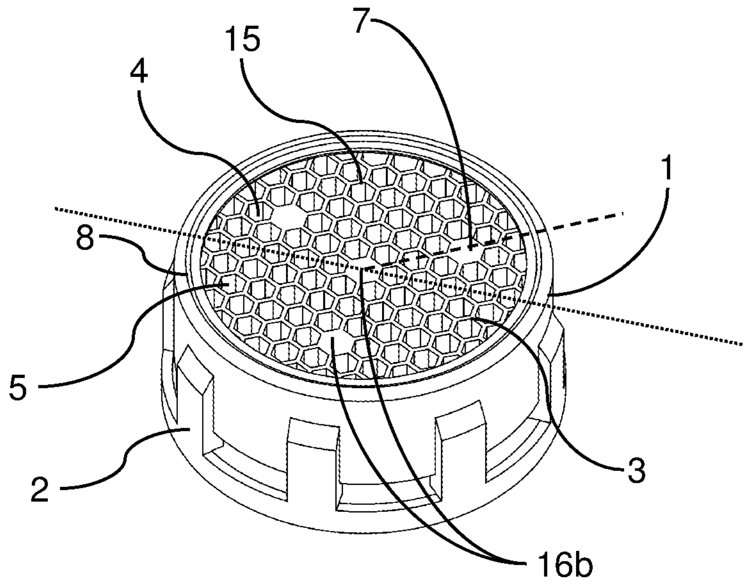

FIG. 1 shows seven different jet regulators, which can each be identified with the aid of the method according to the invention, FIG. 2 shows some details of the jet regulator from FIG. 1, middle position in the top row, FIG. 3 shows the jet regulator in the middle position in the second row from the top in FIG. 1, this time in a perspective view, FIG. 4 shows a photo of the jet regulator of FIG. 3 having mouthpiece attached to the jet regulator, wherein the photo shows a top view of the hole pattern of the jet regulator, FIG. 5 shows a computer graphic obtained from the photo of FIG. 4 by image processing, FIG. 6 shows a hole pattern type identified in the photo according to FIG. 4 or according to FIG. 5, FIG. 7 shows a result of a comparison of the identified hole pattern type according to FIG. 6 to the photo prepared by image processing according to FIG. 5, FIG. 8 shows a superposition of the graphic from FIG. 7 with the hole pattern type from FIG. 6, FIG. 9 shows an illustration of a recognition of deviations between the ascertained hole pattern type according to FIG. 6 and the actual hole pattern of the jet regulator from FIG. 3 or FIG. 4, FIG. 10 shows a further illustration of a recognition of deviations between the ascertained hole pattern type according to FIG. 6 and the actual hole pattern of the jet regulator from FIG. 3 or FIG. 4, wherein in addition a characteristic shape and a characteristic dimension of the outlet structure and a geometric dimension of the hole pattern are ascertained to identify the jet regulator, FIG. 11 shows an example of a jet regulator having a first arrangement type of deviations in comparison to the underlying hole pattern type according to FIG. 6, FIG. 12 shows still another example of a jet regulator, the hole pattern of which is also based on the hole pattern type according to FIG. 6, but having a second arrangement type of deviations that differs from FIG. 11, FIG. 13 shows an example of a jet regulator having a hole pattern, which has multiple axes of symmetry and segmented cells or holes, FIG. 14 shows an example of a jet regulator having a hole pattern, the orientation of which with respect to a marking of the outlet structure can be used in the determination of the jet regulator, FIG. 15 once again shows the jet regulator from FIG. 3 for better direct comparison to a further jet regulator according to FIG. 16, and FIG. 16 shows a further jet regulator for comparison to FIG. 15, wherein the jet regulator of FIG. 16 has a hole pattern having identical hole pattern type to that of the hole pattern from FIG. 15.

DETAILED DESCRIPTION

FIG. 1 shows an array of j et regulators 1 of different sizes and designs, which each have a hole pattern 4 of an outlet structure 3, wherein the hole pattern 4 is based in each case on a regular hexagonal base grid having uniform grid constant (center distance of adjacent honeycombs/cells), which displays a honeycomb structure ("honeycomb grid"). More precisely, the respective hole patterns 4 consist of holes 5 and webs 6 separating the holes 5, wherein individual ones of the holes 5 are filled (filled holes 7).

Alternatively, in further exemplary embodiments a hole pattern type 15 having concentric circles or rectangular grids or combinations of multiple basic types can be implemented, see, for example, FIGS. 11 to 14 in this regard.

For example, in the hole pattern 4 of the top left jet regulator 1 of FIG. 1, a total of four flaws in the regular grid can already be seen with the naked eye. These flaws consist of filled holes 7, which stand out distinctly as black spots. One of the filled holes 7 is arranged centrally here with respect to an outer edge of the hole pattern 4, while the remaining three are arranged concentrically to the central filled hole 7 and span an equilateral triangle, which is indicated by white spots (not part of the jet regulator 1). The four flaws thus form a first arrangement type 16 of deviations with respect to the underlying hexagonal base grid, which represents a hole pattern type 15.

According to the method according to the invention, in a recording step, a photo of the outlet structure 3 or the hole pattern 4 is recorded. In this case, the photo reproduces the hole pattern 4 of the jet regulator 1, and possibly still further parts of the jet regulator 1, such as the entire outlet structure 3. In addition to the hole pattern 4, the outlet structure 3 can have further elements, such as a boundary 8, in particular formed by a mouthpiece 17 attached to the jet regulator 1, as can be seen in the example of the jet regulator 1 of FIG. 4, wherein FIG. 3 shows the same jet regulator 1 without attached mouthpiece 17.

In the recorded photo, the hole pattern 4 is subsequently initially identified by means of image recognition and isolated from the remainder of the jet regulator 1.

A comparison of the hole pattern 4 thus isolated to stored hole pattern types 15, thus to specific basic types of grids, such as hexagonal, radial, or square grids then takes place. Subgroups can also still be formed in this case, such as different hexagonal hole pattern types, which differ in the dimension of their grid constants.

Greatly varying parameters can be used in the comparison to assess the degree of correspondence between the isolated hole pattern 4 of the jet regulator 1 to be identified and the respective stored hole pattern type 15, to thus determine the hole pattern type 15 on which the recorded hole pattern 4 is based.

A correlation between the recorded hole pattern 4 and respective stored hole pattern types 15 can thus be calculated as a figure of merit for the correspondence, for example, by means of image recognition algorithms.

Or, however, characteristics, for example, a shape and/or a number of cells 18 in the grid of the recorded hole pattern 4 can be determined and these can be compared to the corresponding characteristics of the stored hole pattern types 15. On the basis of such a comparison, that hole pattern type 15 is then determined from the stored hole pattern types which displays the highest degree of correspondence with the recorded hole pattern 4 and therefore underlies it.

In a following step, the recorded hole pattern 4 is then compared to the previously determined hole pattern type 15 to establish whether or not deviations exist.

This can be illustrated on the basis of the jet regulator 1 shown in FIG. 3, which has a hole pattern 4 which, as can be seen well in FIG. 3, consists of honeycomb cells 18. More precisely, the hole pattern 4 of FIG. 3 is based on a stored hole pattern type 15, which is shown in FIG. 6, and has/forms a regular hexagonal grid. The grid constant and also the shape of the holes 5/cells 18 of the hole pattern 4 of FIG. 3 is identical here to the hole pattern type 15 according to FIG. 6.

After corresponding rotation and scaling of the recorded hole pattern 4 of the jet regulator 1, the recorded hole pattern 4 can therefore be brought into congruence with the hole pattern type 15 underlying it (in each case on the software level). This permits the detection of deviations which exist in the hole pattern 4 shown in FIG. 3 in the four filled holes 7.

The advantage of a consideration of image rotation is illustratively clear, for example, if one compares the hole pattern 4 of the jet regulator 1 in the center of the middle row of FIG. 1 to the "honeycomb" hole pattern type 15 underlying it according to FIG. 6. This is because upon precise observation of said hole pattern 4 in FIG. 1, it is noticeable that its honeycomb grid is not aligned perfectly horizontally, but is rotated by a few degrees clockwise in comparison to the "honeycomb" hole pattern type 15 according to FIG. 6. After an image rotation of said hole pattern 4 in FIG. 1 counterclockwise, a similar image to that in FIG. 4 would thus result, in which it is immediately noticeable that the two upper filled holes 7 are arranged in different rows of the honeycomb grid, or the central filled hole 7 and the lowermost filled hole 7 are offset horizontally in relation to one another. The impression thus results in FIG. 4 that the three-armed star formed by the four filled holes 7 is rotated by a few degrees counterclockwise, while the three-armed star of said hole pattern 4 appears in FIG. 1 as symmetrical to a vertical axis.

Such fine characteristics distinguish the hole pattern 4 of FIG. 4 or that in the center of the middle row of FIG. 1 or also that of FIG. 12, for example, in each case from the hole pattern 4 on the very left in the uppermost row of FIG. 1 and also from that of FIG. 11. In other words, in the two last-mentioned hole patterns 4, the filled holes 7 are aligned symmetrically to the underlying hole pattern type 15 (for example, in FIG. 11 the two upper filled holes 7 are located in the same row and the two middle filled holes 7 are located in the same column of the underlying hole pattern type 15), while the filled holes 7 of, for example, the hole pattern 4 of FIG. 4 are in particular arranged asymmetrically with respect to the underlying hole pattern type 15. Said hole patterns therefore have different arrangement types 16 with respect to the arrangement of the filled holes 7.

The difference between a symmetrical arrangement of flaws/deviations with respect to an underlying hole pattern type 15—as in FIG. 11—and an asymmetrical arrangement of flaws/deviations—for example as in FIG. 12—is always clear when the recorded hole pattern 4 has been brought into the best possible correspondence with the hole pattern type 15, for example by image rotation. This is because in the example of FIG. 12, the asymmetry is achieved in particular in that axes of symmetry of the flaws/filled holes 7 are pivoted in relation to axes of symmetry of the underlying hole pattern type 15, wherein the arrangement type 16 used—the three-armed star explained here—thus has a symmetry.

However, it is obvious that arrangement types 16 can also be formed, which themselves have an asymmetry. In this case, an asymmetry of the arrangement of the deviations with respect to the underlying hole pattern type 15 will exist even if the arrangement type 16 is not pivoted in relation to the hole pattern type 15. In the hole pattern 4 shown in FIG. 11, an asymmetrical arrangement type 16 may thus be clearly formed, for example, in that the top right filled hole 7 was shifted by one cell upward and a half cell to the left. In this case, the three arms of the star-shaped arrangement type 16 would no longer be equally long, which is easily detectable by image recognition.

The individual steps of the method according to the invention may be reconstructed particularly easily on the basis of FIGS. 3 to 10. FIG. 3 thus shows a perspective view of the jet regulator in the middle position in the second row from the top from FIG. 1, in which the arrangement of the deviations in the form of the filled holes 7 can be seen well with respect to the underlying hole pattern types 15, in the form of a honeycomb grid.

FIG. 4 shows a realistic photo of the jet regulator 1 of FIG. 3, wherein the hole pattern 4 has been recorded frontally together with the mouthpiece 17 connected to the jet regulator 1 with the aid of a smartphone, as is often the case in practice.

By means of a specific application on the smartphone, which the method according to the invention implements by means of software and a digital camera of the smartphone, the solid parts of the jet regulator relevant for the identification are then identified, wherein irrelevant details are suppressed. This is carried out by image processing, which significantly increases the contrast and as a result produces a type of shading of the jet regulator 1, in particular of its hole pattern 4, as shown by the computer graphic of FIG. 5 obtained from the photo of FIG. 4.

In a following step, the regular grid which underlies the hole pattern 4, thus the hole pattern type 15 in the meaning of the invention, is identified as an infinitely extended and—regular in the case of FIG. 6—grid (cf. FIG. 6).

Subsequently, the application determines, by means of image processing, deviations, thus in particular flaws, between the ascertained hole pattern type (according to FIG. 6) and the recorded hole pattern 4 prepared by image processing (according to FIG. 5). This comparison, which can in particular comprise scaling and rotation of the hole pattern 4 or the hole pattern type 15, leads to the result according to FIG. 7.

More precisely, for this purpose in the evaluation step in the recorded photo according to FIG. 5, a circular image region 20 (cf. the dashed line in FIG. 5) is isolated, which reproduces the hole pattern 4. Subsequently (within this image region 20—cf. the dashed line in FIG. 7), a subtraction is performed between the isolated image region 20 and the ascertained hole pattern type 15 according to FIG. 6. For this purpose, the photo and thus the image region is aligned with respect to the hole pattern type 15 before the subtraction. This alignment can comprise an image rotation and/or an image stretching. The result of this subtraction are the four distinctive filled holes 7, which are illustrated within the isolated image region 20 in FIG. 7.

On the basis of the result according to FIG. 7, the software is thus capable of recognizing both the characteristic filled holes 7 of the hole pattern 4 to be identified, and also their number and relative position in relation to one another and also with respect to further structures of the jet regulator 1 (thus, for example, the circumferential boundary 8, the markings 13, or the outer edge 12 of the hole pattern 4 or the outlet structure 3—cf. FIG. 7).

In a further (optional) step, the recognized deviations can be brought into the greatest possible correspondence with the underlying hole pattern type 15 (in this case the regular, infinitely extended honeycomb grid of FIG. 6), as illustrated in FIG. 8. The filled holes 7 thus reach in particular associated grid positions. By way of this comparison between the previously ascertained deviations and the ascertained hole pattern type 15, relative positions of the deviations can thus be ascertained, in particular with respect to the underlying hole pattern itself and/or in relation to one another and/or with respect to the outlet structure 3 or the housing 2 of the jet regulator 1.

It can thus be ascertained, for example, whether respective filled holes are arranged in the same or different lines of the grid (as can be seen well in FIG. 8). In other words, a specific geometric arrangement of the deviations can thus be ascertained, wherein this is possible for both regular and also irregular grids. From these items of information, in particular an arrangement type 16 may be ascertained, which characterizes/defines the arrangement of the flaws with respect to the underlying hole pattern type 15.

Further advantages of a comparison of the ascertained deviations to the underlying hole pattern type 15, as shown in FIG. 8, become clear on the basis of FIGS. 9 and 10: FIG. 9 thus shows how a relative position of two flaws in the form of filled holes 7 in relation to one another can be ascertained with the aid of the underlying hole pattern type 15. The underlying grid 15 is used here as a scale and as a coordinate system. The horizontal and also the vertical center distance between the filled holes 7 shown in the detail view of FIG. 9 thus corresponds in each case to precisely two grid constants (the grid constant corresponds here to the center distance of adjacent honeycombs). A feature which characterizes the associated hole pattern 4 of the jet regulator 1.

It is furthermore illustrated on the basis of FIG. 10 that a geometric dimension of the hole pattern 4 can be ascertained in the evaluation step on the basis of the recorded photo. In FIG. 10, the respective computer-implemented determination of a width 9 of a circumferential boundary 8 around the hole pattern 4 and also of a diameter 10 of the hole pattern 4 is thus illustrated.

In this determination, the application accesses the stored grid constant of the underlying hole pattern type 15 and ascertains, on the basis of the comparison illustrated in FIG. 10 of the ascertained deviations to the underlying hole pattern type 15, these geometric dimensions as multiples of the grid constants. It can thus be assessed with the naked eye in the detail view of FIG. 10 that the hole pattern 4 of the jet regulator 1 according to FIGS. 2 to 4 has a diameter of more than twelve grid constants, while said width is less than one grid constant.

The size of a honeycomb of the hole pattern type 15 is thus used here as a virtual reference scale. This measurement is enabled by the best possible bringing into congruence of the ascertained deviations (thus in particular of the filled holes 7) with the underlying hexagonal grid, as was already explained with respect to FIG. 8.

One example of the use of different arrangement types 16 of deviations with respect to an underlying hole pattern type 15 according to the invention is shown by the two jet regulators 1 on the far left and far right in the middle row of FIG. 1. These have the same hole pattern type 15, namely a regular honeycomb grid. However, it is noticeable that the number of non-filled holes 5 between the respectively filled holes 7 is embodied differently: Thus, for example, in the left hole pattern 4 in the middle row of FIG. 1, five honeycomb-shaped holes 5 are located between the two uppermost filled holes 7, while in the right hole pattern 4 in the middle row of FIG. 1, there is only a single honeycomb-shaped hole 5, which is identified by the reference sign 5.

Furthermore, it is noticeable that the vertical center distance in each case between the two uppermost filled holes 7 of the left hole pattern 4 in the middle row of FIG. 1 and the filled hole in the center 7 is exactly two grid constants, while in the right hole pattern 4 in the middle row of FIG. 1, it is only one grid constant. In other words, the outer filled holes 7 in the left hole pattern 4 are farther away from the central filled hole 7 than in the right hole pattern 4. These differences in the arrangement of the filled holes 7 may be identified very easily using image recognition algorithms, if the underlying hole pattern type has been recognized. A differentiation between the two arrangement types 16*a* and 16*c* used in each case is thus possible on the basis of these differences, although both arrangement types 16*a* and 16*c* are based on a three-armed symmetrical star, made up of a total of four filled holes 7 in each case.

Upon precise observation it is now also apparent that the middle hole pattern 4 shows a third arrangement type 16*b*, which differs from the previously discussed arrangement types 16*a* and 16*c* (cf. in this regard, for example, the number of honeycombs between the two uppermost filled holes 7).

The lowermost jet regulator 1 in FIG. 1, the hole pattern 4 of which is also based on a hexagonal basic grid, and the four filled holes 7 of which display the above-described arrangement types 16*b*, is again distinguishable from the middle hole pattern 4 in the middle row of FIG. 1. This is because, for example, the diameter of the hole pattern 4 in the lowermost jet regulator 1 in FIG. 1 is approximately nine grid constants, while in the middle jet regulator 1 in the middle row of FIG. 1, it is approximately eleven grid constants. In other words, the respective hole patterns 4 thus differ in at least one geometric dimension in the meaning of the invention.

As a comparison, for example, of FIGS. 11 and 12 shows, which illustrate further jet regulators 1, which are identifiable using the method according to the invention, a rotation between the arrangement of flaws or deviations with respect to an underlying hole pattern type can also be applied in combination with the use of different arrangement types 16 to make jet regulators 1 distinguishable from one another. This is because in addition to the above-described rotation of the three-armed star consisting of the four filled holes 7 in FIG. 12, it is noticeable that the jet regulators 1 of FIGS. 11 and 12 display different arrangement types 16*a* and 16*b*, which are already known from the two left jet regulators 1 in the middle row of FIG. 1.

On the basis of this entire information ascertained in the evaluation step by computer-implemented evaluation of the photo of the jet regulator 1, in the identification step of the method according to the invention, the identification information can finally be ascertained which unambiguously identifies the jet regulator 1 to be identified. It can also occur here that the recorded hole pattern is configured identically to the previously determined hole pattern type, so that no deviations exist. This is because an unambiguous assignment to an item of identification information can also take place in such a case. After output of this identification information, for example a product number, the user is thus capable of identifying the jet regulator 1.

The entire above-described method may be executed, for example, on a commercially available smartphone, which is only to be equipped with a typical camera and corresponding software. If the software has recognized the jet regulator using the method, for example, current purchase prices for the identified jet regulator can be retrieved from the Internet and displayed to the user. Such a retrieval of additional information on the identified jet regulator can in particular be automatically implemented and/or can be part of the method.

In the jet regulators 1 shown in FIG. 1, it is noticeable that these are all based on the same basic hole pattern type, namely a regular hexagonal grid, and moreover have nearly identical flaws. This is because each of the jet regulators 1 in FIG. 1 has four filled holes 7, which are arranged symmetrically to the center point of the respective hole pattern 4 in identical orientation. All hole patterns 4 shown in FIG. 1 thus display a high similarity of the arrangement type 16 with respect to the deviations in relation to the underlying hole pattern type 15. Solely on the basis of the different horizontal distances between the filled holes 7—each measured in grid constants of the underlying hole pattern type 15—however, three different arrangement types 16*a*, 16*b*, and 16*c* can already be identified in the middle row, for example.

To also still permit an identification of the respective jet regulator 1 in such a situation, in the method according to the invention, as already described above, additional information can be used to be able to identify the jet regulator 1. Thus, for example, a diameter 10 of the hole pattern 4, or a width 9 of a boundary 8, or a diameter 11 of the outlet structure 3, as illustrated in FIG. 2, can be ascertained to determine the identification information in the identification step therefrom. Accordingly, in these cases not only the hole pattern 4 but rather the entire outlet structure 3 has to be recorded if necessary in the recording step. A stored type constant, such as the grid constant of the ascertained hole pattern type in millimeters, can also be used in the ascertainment to thus enable a simple estimation of, for example, a diameter.

FIGS. 11 to 14 show further jet regulators 1, which can be identified using the method according to the invention. It can be seen here that in addition to honeycomb-shaped hole pattern types 15 (as in FIGS. 11 and 12), other regular grids can also be used as hole pattern types 15, such as radial grids—as in FIG. 13—or grids having right angles, as illustrated in FIG. 14. Mixed forms can also occur here, as the jet regulator 1 of FIG. 14 shows, the hole pattern 4 of which has both horizontally and vertically extending and also radially arranged webs 6.

It may be reconstructed well on the basis of FIG. 14 how according to the invention a hole pattern 4 and thus the associated jet regulator 1 can be recognized on the basis of a position of a marking 13 of the outlet structure 3. This is because in the hole pattern 4 of FIG. 14, the four radially arranged webs 6 are immediately noticeable, the intersection of which with the outer edge 12 of the hole pattern 4 specifies target positions and which therefore each function similarly to a clock hand. The outer bulges formed by the housing 2 of the jet regulator 1 form markings 13 here in the meaning of the invention, the position of which can be compared to that of the radial webs 6 by means of corresponding algorithms. Thus, for example, a further jet regulator 1 distinguishable from the jet regulator 1 of FIG. 14 could be created, in which these markings 13 were each pivoted by a few degrees clockwise or counterclockwise in relation to the radial webs 6 of the hole pattern 4.

In further exemplary embodiments, it can additionally or alternatively be provided that a measure of a web width and/or an extension of a cell is set with respect to another measure, or even with respect to multiple measures. Characteristic deviations can also be recognized by such comparisons in order to ultimately identify the jet regulator 1 with the aid of the method according to the invention.

This may be illustrated well from FIG. 13, which shows a further jet regulator 1, which can be identified using the method according to the invention. The associated hole pattern 4 of FIG. 13 is based on a regular star-shaped hole pattern type 15 and is accordingly formed radially. It is noticeable here that three cells 18*a*, 18*b*, and 18*c* are formed, each in the form of flat circular rings, which are separated from one another by the outermost edge of the hole pattern 4 and concentrically arranged circular webs 19*a*, 19*b*. Radially oriented webs 6 are arranged in each of these circular rings. The webs 6 of the innermost, the middle, and also the outermost circular ring align here, thus point in the same radial direction, as can be seen easily if one follows the three webs 6 of the innermost circular ring 18*c*.

Furthermore, it can also be seen that the radial webs 6 of the outermost circular ring 18*a* are each aligned centrally in relation to outer markings 13, which are formed by the housing 2 of the jet regulator 1.

Starting from this hole pattern 4 of FIG. 13, manifold variations may now be devised, which can each be distinguished using the method according to the invention. It is thus noticeable in FIG. 13, for example, that the webs 6 of the innermost circular ring/the innermost cell 18*c* are formed wider than the radial webs 6 of the middle cell 18*b* and those of the outermost cell 18*a*. In other words, the radial webs 6 of the innermost circular ring are thus formed wider than a predefined relative web width 14 of the underlying hole pattern type 15 (cf. the two arrows in FIG. 13, which illustrate the web width 14 of the radial webs 6 of the innermost circular ring). It is obvious here that a new arrangement type 16 could be formed easily by instead forming the radial webs 6 of the middle cell 18*b* and/or those of the outermost cell 18*c* thicker and leaving the inner webs 6 in the predefined relative web width 14 of the associated hole pattern type 15. Such detectable differences are also thus based on different geometric dimensions of the respective hole patterns 4.

Furthermore, a further arrangement type 16 and thus a new jet regulator 1 distinguishable using the method according to the invention from the jet regulator 1 shown in FIG. 13 could be created in that the radial webs 6 of the middle cell 18*b* are rotated clockwise/counterclockwise by a few degrees in relation to the radial webs 6 of the innermost cell 18*c*, so that the webs 6 thus no longer align. This is therefore an example of a web changed in its position and/or orientation, which can be used for identifying the jet regulator 1.

In addition, it can be seen in FIG. 13 that the radial extension of the middle cell 18*b* is greater than that of the outer cell 18*a* and that of the inner cell 18*c*. For this purpose, the radial webs 6 in the region of the middle cell 18*b*, thus the distance between the two circular webs 19*a* and 19*b*, are made longer than the respective length of the radial webs 6 in the inner cell 18*c* and the outer cell 18*a*. Furthermore, the number of holes 5 in the outer cell 18*a* is also higher than in the middle cell 18*b* and in the inner cell 18*c*, due to the higher number of webs 6. Such parameters can therefore also be used to generate identifiable deviations from the underlying regular hole pattern type 15, which are detectable using the method according to the invention. The underlying radially-symmetrical hole pattern type 15 can be designed here, for example, so that the cells 18*a*, 18*b*, and 18*c* each have an equal radial extension, which, in addition to the arrangement of the webs or the width of the ring-shaped circular webs 19*a*, 19*b*, represents a possible characteristic of the hole pattern type 15.

Finally, it can also be seen in FIG. 13 that the outer ring-shaped circular web 19*a* is formed thicker, that is to say wider than the inner circular web 19*b*. This also represents a characteristic feature in the meaning of the invention, which can be deliberately recognized and thus used for identifying the hole pattern 4 and thus the jet regulator 1.

All deviations or characteristics explained above with respect to FIG. 13, thus in particular

- the configuration of respective thicknesses of webs 6 (that is to say, for example, radial webs 6 and/or circular webs 19),
- the number and/or shape of holes 5 within cells 18 separated from one another,
- the size of cells 18,
- the length of webs 6 and/or
- their orientation/alignment in relation to one another and/or in relation to characteristic markings 13, which each exist with respect to the underlying radially-symmetrical hole pattern type 15, can define a respective arrangement type 16 of the deviations in the meaning of the invention, which can be recognized with the aid of the method according to the invention and used to identify the relevant jet regulator 1.

Upon use of the method according to the invention, there are no fundamental restrictions with respect to the desired configuration of the outlet structure 3. These can assume all possible shapes. As long as it is defined which hole pattern type 15 underlies the outlet structure 3, deviations can be determined which permit an identification of the jet regulator 1. In the extreme case, there can also be no deviation at all, so that the jet regulator 1 is characterized by an identity of its hole pattern 4 with the underlying hole pattern type 15, wherein of course further deviations can also exist due to the housing 2 or the mouthpiece 17 in such a case.

In summary, to improve the accuracy and also the robustness of a method for identifying a jet regulator 1 on the basis of a recorded photo of a hole pattern 4 of an outlet structure 3 of the jet regulator 1, it is proposed that the recorded photo initially, in a first step, be compared in a computer-implemented manner to different stored hole pattern types 15, wherein based on an assessment of a respective degree of correspondence between the recorded photo and the respective hole pattern type 15, a hole pattern type 15 underlying the recorded hole pattern 4 is ascertained, and that subsequently, in a further step, the ascertained hole pattern type 15 is examined in a computer-implemented manner using the recorded hole pattern 4 for deviations, wherein on the basis of established or non-established deviations, identification information unambiguously identifying the jet regulator 1 is ascertained in a computer-implemented manner and output if necessary.

In the last step, it is advantageous here if a set of stored arrangement types 16 is accessed, which define respective deviations between the hole pattern 4 to be identified and the hole pattern type 15 underlying it (and already identified).

FIGS. 15 and 16 finally illustrate that using the method according to the invention, different types of jet regulators 1 can also still be distinguished if these each have outlet structures 3 having hole patterns 4, the hole pattern type 15 of which corresponds: A hexagonal regular grid underlies both hole patterns 4 of the jet regulators 1 of FIGS. 15 and 16 as the hole pattern type 15. Moreover, both hole patterns 4 each have four filled holes 7 as deviations from the hole pattern type 15. The four filled holes 7 are also each arranged asymmetrically with respect to the underlying hole pattern type 15, as was already described with reference to FIG. 4. In relation to the arrangement of the filled holes 7 with respect to the underlying hole pattern type 15, the hole patterns 4 of FIGS. 15 and 16 thus have a very similar if also not identical arrangement type 16 (one compares the distance of the filled holes 7 to one another in each case).

It can be seen clearly in the direct comparison of FIGS. 15 and 16 that the distance of the deviations, i.e., of the filled holes 7, from the boundary 8 of the respective hole pattern 4, each measured in grid constants of the hexagonal grid, is greater in FIG. 15 than in FIG. 16 (measured for this purpose in each case on the basis of the dashed line starting from the centrally arranged filled hole 7). Both hole patterns 4 do have a diameter of approximately 11 grid constants, as can be read on the basis of the dotted lines. However, the distances of the filled holes 7 from one another are each different. The hole patterns 4 of FIGS. 15 and 16 may thus be distinguished on the basis of their respective arrangement type 16*a*, 16*b* of deviations.

A further possibility for differentiating jet regulators is the use of different diameters for the respective hole patterns 4, each in relation to the underlying hole pattern type 15. This is because it can also be provided in the method according to the invention that a diameter of the hole pattern 4 is ascertained and in the identification step, the identification information is determined at least on the basis of this ascertained dimension. This then also still permits an identification of a respective beam regulator 1 if both its hole pattern type 15 and also its arrangement type 16 of the deviations are identical to the hole pattern 4 of a further jet regulator 1.

LIST OF REFERENCE NUMERALS 1 jet regulator
2 housing

3 outlet structure
4 hole pattern
5 hole
6 web
7 filled hole
8 boundary (of 4)
9 width (of 8)
10 diameter (of 4)
11 diameter (of 3)
12 outer edge (of 3)
13 marking
14 web width
15 hole pattern type
16 arrangement type
17 mouthpiece
18 cell
19 circular webs
20 isolated image region

The invention claimed is:

1. A computer-implemented method for automatically identifying a jet regulator (1), which has a housing (2) on which an outlet structure (3) having a hole pattern (4) is formed on an outlet side, the method comprising:

in a recording step, recording a photo of the hole pattern (4) using a camera;

in an evaluation step, a computer evaluating the photo for characteristics of the hole pattern (4), the hole pattern (4) being initially identified by the computer using image recognition and isolated from the remainder of the jet regulator (1) by the computer, the computer ascertaining a hole pattern type (15) of the hole pattern (4) by comparing the isolated hole pattern (4) to different stored hole pattern types (15), the computer ascertaining at least one deviation between the isolated hole pattern (4) and the ascertained hole pattern type (15) based on the photo, and the computer obtaining further information about the relative arrangement of the at least one deviation by ascertaining at least one relative position of the at least one deviation by way of a comparison to the ascertained hole pattern type (15), wherein, in the evaluation step, the at least one deviation is determined by isolating the hole pattern (4) in the photo as an image region (20) and subsequently carrying out a subtraction between the image region (20) and the hole pattern type (15), wherein the ascertained at least one relative position relates to at least one of (i) the isolated hole pattern (4), (ii) the at least one deviation in relation to one another, (iii) the outlet structure (3), or (iv) the housing (2), wherein the ascertained at least one deviation is selected from the group consisting of (i) a thickness or a length of a web of the hole pattern (4), wherein the web comprises a radial web (6) or a circular web (19), (ii) a relative radial alignment of radial webs (6) of two circular rings of the hole pattern (4), (iii) an orientation or alignment of radial webs (6) of the hole pattern (4) in relation to one another or in relation to a marking (13) of the outlet structure (3), (iv) a relative position between radial webs (6) of the hole pattern (4) and markings (13) of the outlet structure (3) formed by the housing (2) of the jet regulator (1), (v) relative radial lengths or orientations of radial webs (6) of an inner cell (18*c*) and an outer cell (18*a*) of the hole pattern (4), or (vi) a combination thereof;

in an identification step, the computer determining, based on a result of the evaluation, identification information for the jet regulator (1) based on the ascertained at least one deviation and the ascertained at least one relative position; and in an output step, the computer outputting the identification information.

2. The computer-implemented method as claimed in claim 1, further comprising, in the identification step, additionally determining the identification information based on the hole pattern type (15).

3. The computer-implemented method as claimed in claim 1, wherein in the evaluation step, determining the hole pattern type (15) includes carrying out a comparison between characteristics of the hole pattern (4) and multiple stored hole pattern types (15), and the hole pattern type (15) is ascertained based on at least one of a shape or a relative arrangement of cells (18) of the hole pattern (4).

4. The computer-implemented method as claimed in claim 1, wherein the ascertaining of at least one of the hole pattern type (15) of the hole pattern (4) or the at least one deviation is carried out using a computer-based comparison to multiple stored hole pattern types (15).

5. The computer-implemented method as claimed in claim 1, wherein the hole pattern type (15) is ascertained by at least one of pattern recognition or calculation of a correlation.

6. The computer-implemented method as claimed in claim 3, wherein at least one of a) the hole pattern type (15) of the hole pattern (4) is a regular or an irregular pattern or b) the multiple stored hole pattern types (15) are each regular or irregular patterns.

7. The computer-implemented method as claimed in claim 1, further comprising, in the evaluation step, upon the ascertainment of the hole pattern type (15) of the hole pattern (4), at least one of rotating or aligning the photo to bring the hole pattern (4) into congruence with the hole pattern type (15) underlying it.

8. The computer-implemented method as claimed in claim 1, further comprising, in the evaluation step, upon the ascertainment of the at least one deviation, detecting at least one of a number of deviations or at least one relative position of the at least one deviation, each with respect to the hole pattern type (15).

9. The computer-implemented method as claimed in claim 1, further comprising, in the evaluation step, upon the ascertainment of the at least one deviation, detecting at least one of a) at least one filled hole (7) of the hole pattern (4), with respect to the hole pattern type (15), or b) at least one hole (7) of the hole pattern (4) that is changed in at least one of a shape, size, position, or orientation in comparison to the hole pattern type (15).

10. The computer-implemented method as claimed in claim 1, further comprising, in the evaluation step, upon the ascertainment of the at least one deviation, detecting at least one web (6) of the hole pattern (4) which is changed with respect to the hole pattern type (15).

11. The computer-implemented method as claimed in claim 1, further comprising, in the evaluation step, ascertaining an arrangement type (16) of the ascertained at least one deviation using the computer by taking into consideration at least one of (i) a relative position of a deviation with respect to the hole pattern type (15), (ii) a relative position of at least two deviations in relation to one another, or (iii) respective relative positions of at least two deviations with respect to the hole pattern type (15).

12. The computer-implemented method as claimed in claim 1, further comprising, in the recording step, recording a photo of the outlet structure (3) including the hole pattern (4) and, in the evaluation step, based on the photo, ascertaining at least one of a characteristic shape, a position of a marking (13) of the outlet structure (3), or a characteristic dimension, and in the identification step, determining the identification information based on the at least one of the characteristic shape, the position of the marking (13), or the characteristic dimension.

13. The computer-implemented method as claimed in claim 12, further comprising, in the evaluation step, based on the photo, determining a geometric dimension of the hole pattern (4), and in the identification step, determining the identification information at least on the basis of the geometric dimension.

14. The computer-implemented method as claimed in claim 13, wherein the characteristic dimension is a diameter (11) of the outlet structure (3) and the geometric dimension is a diameter (10) of the hole pattern (4), and in the identification step, the identification information is determined at least based on a ratio of these two diameters (10, 11).

15. The computer-implemented method as claimed in claim 12, wherein the characteristic dimension is a characteristic dimension of a cell (18).

16. The computer-implemented method as claimed in claim 12, wherein the characteristic dimension is determined using a stored type constant.

17. The computer-implemented method as claimed in claim 1, further comprising, in the evaluation step, based on the photo, ascertaining at least one of a number of axes of symmetry or at least one location of an axis of symmetry of the hole pattern, and in the evaluation step, ascertaining the hole pattern type (15) using at least one of the number of axes of symmetry or the at least one location of an axis of symmetry.

18. The computer-implemented method as claimed in claim 1, further comprising, in the identification step, determining the identification information based on a relative rotational position between the outlet structure (3) and the housing (2).

19. The computer-implemented method as claimed in claim 1, wherein the identification of the jet regulator (1) takes place without recourse to a reference scale in the photo.

20. The computer-implemented method of claim 1, further comprising executing the method on a portable electronic terminal.

21. The computer-implemented method of claim 1, further comprising sorting jet regulators (1) by carrying out the method on a plurality of the jet regulators.

* * * * *